United States Patent [19]

Salter

[11] 4,014,293
[45] Mar. 29, 1977

[54] FISH EGG INCUBATOR
[75] Inventor: Frederick H. Salter, Juneau, Alaska
[73] Assignee: The United States of America as represented by the Secretary of Commerce, Washington, D.C.
[22] Filed: July 24, 1975
[21] Appl. No.: 598,909
[52] U.S. Cl. .................................................. 119/3
[51] Int. Cl.² ...................................... A01K 61/00
[58] Field of Search .................................... 119/2–5
[56] References Cited
UNITED STATES PATENTS

| 680,838 | 8/1901 | Bourgeois | 119/3 |
| 1,023,590 | 4/1912 | Parry | 119/3 |
| 3,028,837 | 4/1962 | Tuttle | 119/3 |
| 3,584,602 | 6/1971 | Stasio | 119/3 X |
| 3,886,905 | 6/1975 | McNeil | 119/3 |

Primary Examiner—J.N. Eskovitz
Attorney, Agent, or Firm—Eugene J. Pawlikowski; Alvin J. Englert

[57] ABSTRACT

A fish egg incubator consisting of an upper removable egg tray having a screen bottom and a lower trough containing a rugose material substance is described. Water flows continuously over both the egg tray and rugose substrate. The eggs hatch out on the screen tray and the alevins fall through the mesh to the rugose substrate where they continue the development to the fry stage. At the proper development stage the fry migrate out of the rugose substrate and are carried out by the water stream and are collected.

10 Claims, 6 Drawing Figures

FISH EGG INCUBATOR

BACKGROUND OF THE INVENTION

Large-scale production of salmon and trout fry in hatcheries has been carried out in essentially the same manner for over a century, and the basic procedures and components have changed little. In recent years, it has become increasingly apparent that although the survival of eggs to the fry stage is much better when the eggs are incubated in hatcheries than in nature, the quality of the hatchery fry is often poor. The low quality of the fry is not as significant in species protected and reared in the hatchery for a few weeks or months (such as chinook and coho salmon), but it may be a critical factor in species released to the wild as fry (such as pink and chum salmon). In recent years, efforts have been made by many expeimenters to develop incubation systems that would produce higher quality fry at less cost and at remote sites or sites inaccessible during winter.

Gravel is the natural substrate for incubating salmon eggs and alevins. Although eggs can be incubated successfully in trays or other types of containers with smooth substrates, alevins tend to be more active on smooth substrate than on gravel. This increased activity leads to premature swimming and contributes to poor conversion of yolk to body tissue, resulting in undersized and frequently abnormal fry. New types of hatchery systems, called gravel incubators, can avoid these problems. Gravel incubators do work, but because of the high cost of labor, materials, and transportation in remote areas, e.g. Alaska, a system is needed that requires a minimum of lightweight material and can be transported by air at relatively low expense.

SUMMARY OF THE INVENTION

Each incubator unit consists of two sections—a top or upper section which nests into a bottom or lower section. Incubators can be operated in stacks or singly. The extended lower sides of the bottom section of each unit hold the nest unit in place when they are stacked.

Each section of the incubator contains a removable screen-type egg tray which can be charged with green eggs and inserted or removed while the incubators are in operation. Water is directed into an upper head chamber of the top section in each stack and flows by gravity through all the units below.

Water enters the upper head chamber and flows under an upper baffle. Some of the water then flows horizontally through a rugose substrate on the base of the section. A portion of the water upwells through the egg trays and then flows horizontally over the eggs. All the water flows in a thin sheet over an overflow lip and drops down to a head chamber of the bottom section. The water then goes under a baffle and flows as described above. The water then flows over an overflow lip of the lower section and is discharged to the head chamber of the unit below, if any.

The incubators are inspected periodically to see whether the eggs have hatched and the alevins fallen through the mesh of the egg trays to the substrate below. After the alevins have fallen through the tray an access door is opened, and the egg trays are removed by pulling the pair of cords attached to the sides of the tray. If desired, a fine mesh cover screen can be inserted in place of the egg tray at this time to prevent migration of the alevins.

A parallel-rod fry separator is attached to the downstream face of the overflow lip just before fry are expected to migrate. The fry separator allows the migrating fry to enter a fry collector rather than pass on into lower sections of the incubator. Most of the water passing the overflow lip falls through the parallel rods into the lower head chamber and the fry slide down the rods into the fry collector. When the fry separator is placed in the unit, a small flow of water is started into the fry collector of the uppermost section in the stack. This water builds up to the top of a standpipe in the fry collector and then overflows to the fry collector of the next lower unit. The water in the fry collector cushions the fry's fall off the parallelrod fry separator. The emerging fry in each stack of incubators accumulate in the lowest unit and are collected. If it is desired to collect the fry from any individual tray, this can be accomplished by a suitable arrangement of equipment.

It is an object of the present invention to provide an improved fish incubator means having a readily removable perforated or meshed egg tray located above a trough containing a rugose layer, a stream of water flowing over and through the egg tray and trough, wherein the alevins fall through the opening in the egg tray into the rugose layer, and wherein the fry migrate out of the layer and are separated and recovered.

It is a further object of the invention to enclose the fish incubator set forth above in a light tight compartment with hatch openings for interior access and having light shielded air ventilation means.

It is a further object of this invention to enclose the egg tray and trough set forth above in a container open at the top and bottom and adapted to be vertically nested into similar egg tray trough and container combinations to form a set and having water conduits arranged so that the water from one combination flows into the lower one, and having an upper cover and a lower base to close off the top and bottom of the egg tray, trough and container combinations.

Further objects will become apparent from the specification and claims set forth below.

THE DRAWING

DESCRIPTION OF THE PREFERRED EMBODIMENTS

Figure 1:
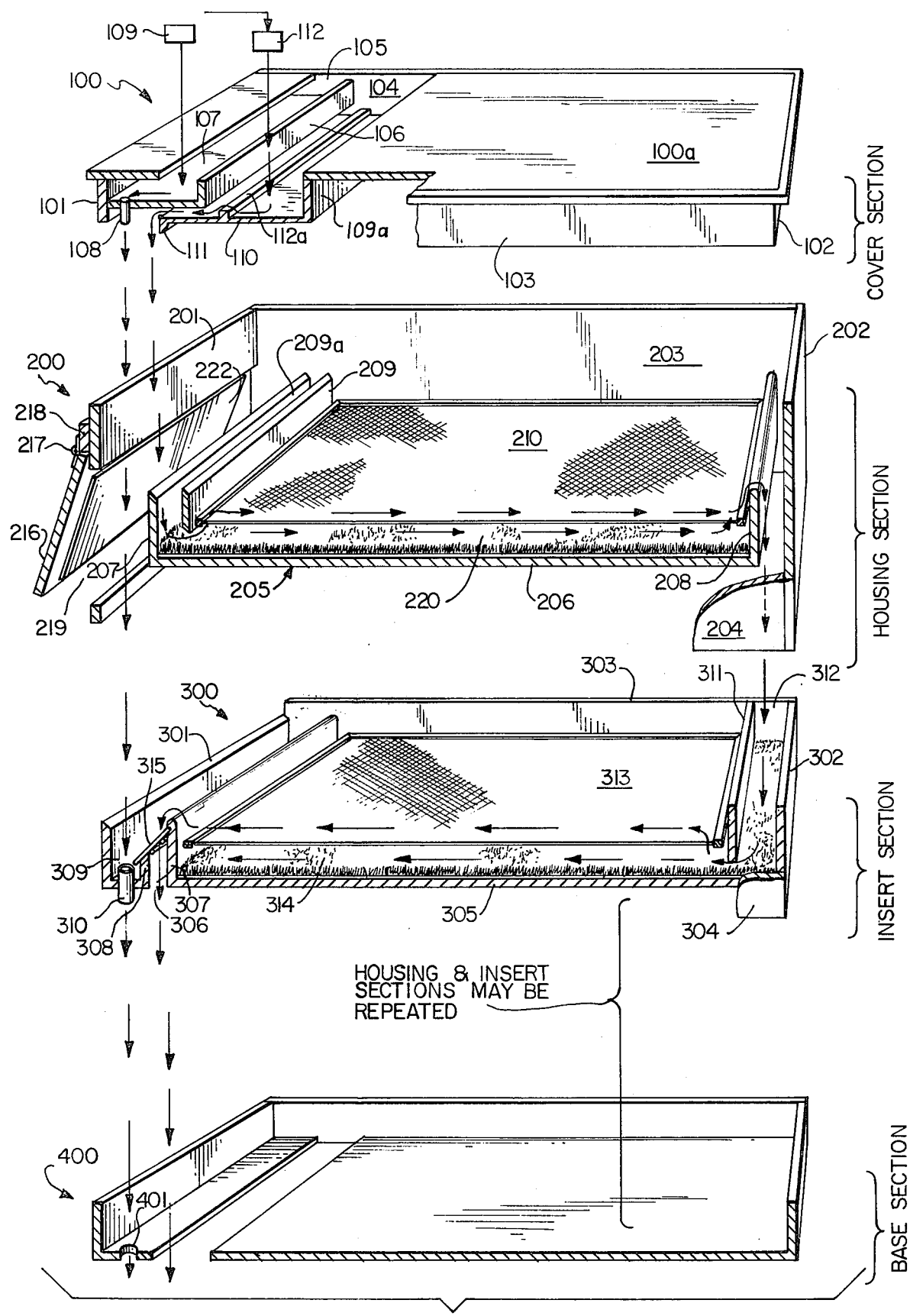
FIG. 1 is an expanded isometric view of one embodiment of the incubator, partly in section, and showing the internal structure.

In the embodiment shown in FIG. 1, the cover section of the incubator is indicated generally by reference numeral 100. The cover consists of a top 100a, two ends 101 and 102 and two side 103 and 104. An opening 105 is provided near one end of top 100a. A transverse baffle 106 is mounted between sides 103 and 104 beneath the opening, as shown in FIG. 1. Fastened to the bottom of the 106 to sides 103 and 104 and end 101 is flat base member 107. It will be seen that members 101, 103, 104, 106 and 107 together form a trough. A drain opening 108 is provided in 107, near end 101, and a water supply pipe source 109 is located above the trough, whereby water can enter the trough and flow out through the drain.

Located behind the trough is a spillway consisting of a transverse cross member 109a at the inner end of opening 105 and fastened to top 100a and sides 103 and 104. Secured to the bottom portion of 109a and sides 103 and 104 is a flat bottom member 110. A cross member 111 may be attached to the end of 110 as shown in the drawing, to serve as a lip. A baffle member 112a of relatively low height is mounted transversely on 110. A water supply source is located directly above the spillway defined by 109a and 110. It is seen that a channel is provided for water flow between 107 and 110, and while the depths of baffle 106 and 109a may vary considerably, the dimensions must be selected to provide an adequate channel for water flow.

Beneath the cover section 100 is located the housing section, generally designated by reference numberal 200. Said housing section consists of an open box having end sections 201 and 202 and sides 203 and 204. The inner dimensions of the housing section are such that cover section 100 fits into the top part of 200 snugly and without binding.

A trough unit 205 is located within approximately the mid depth portion of the housing unit and consists of a flat base portion 206 and end portions 207 and 208. Elements 207 and 208 are fastened to base 206 at the ends thereof and all of these elements are attached to sides 203 and 204 whereby a watertight structure is obtained. Elements 207 and 208 are spaced from 201 and 202 to provide a passageway for water flow, and the upper end of 208 is rounded as shown.

Figure 3:
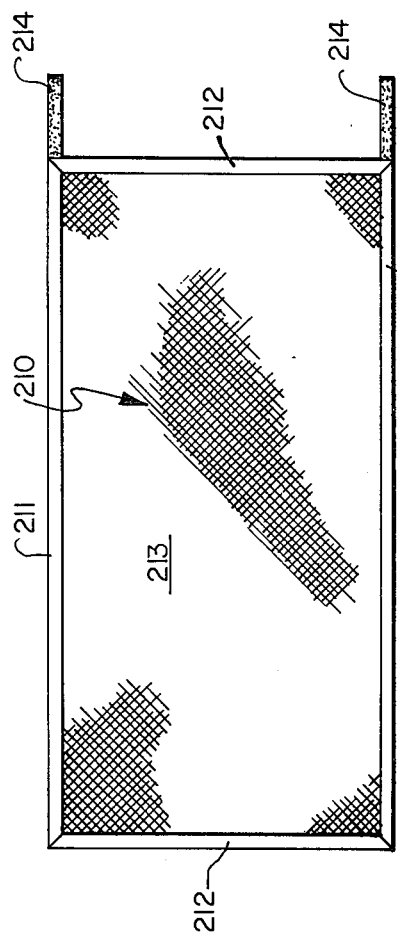
FIG. 3 is a plan view of the egg tray.
Figure 4:
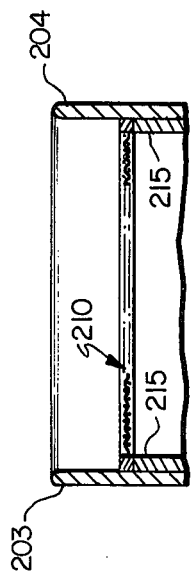
FIG. 4 is a transverse sectional view of the housing section showing details of the egg tray support.

A transverse baffle 209 extends between sides 203 and 204 and is spaced from 207 to define a water passage 209a which is located directly below lip 111, so that water flowing over the said lip will fall through passageway 209a. The upper edge of 209 is at the same height as end 207, while the bottom of 209 is located above 206 a distance sufficient to accomodate a rugose substrate as will be described hereinafter, and to allow adequate water flow. Passageway 219, defined by elements 201 and 207, is in line vertically with drain 108. Located within trough 205 between end 208 and baffle 209 is an egg tray or screen 210. As best shown in FIG. 3, the egg tray or screen consists of a framework having sides 211,211 and end pieces 212,212 and a meshed screening 213. Attached to the sides 211 at one end thereof are pull tapes or cords 214,214. As shown in FIG. 4, the egg tray rests on tracks 215.

Figure 6:
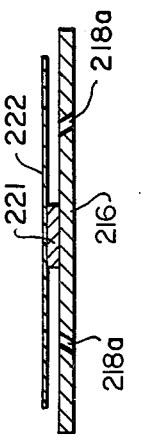
FIG. 6 is a section of the door taken along line 6—6 of FIG. 6.
Figure 5:
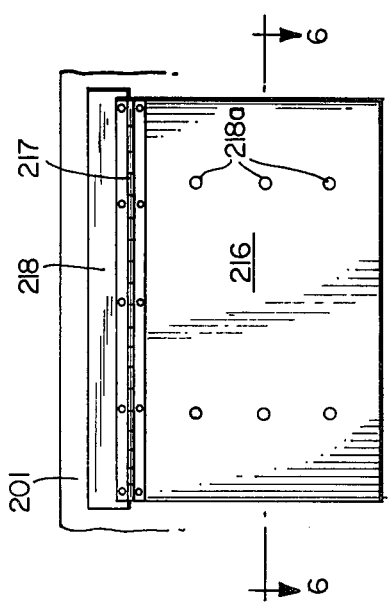
FIG. 5 is a detail plan view of the door.

To enable removal of an egg tray without distrubing the assemblage of sections, a hinged door is provided at one end of housing section 200. As shown in FIG. 1, end section 201 has a rectangular opening of a width sufficient to pass egg tray 210 therethrough. Mounted on this end section is a rectangular door 216 hinged at the top by means of hinge 217 and offset strip 218 (FIGS. 5 and 6). Door 216 has a series of holes 218a drilled through for ventilation. A light baffle consisting of elements 221 and 222 is provided to prevent light from entering through holes 218a. To remove the egg tray, door 216 is opened, the pull cords 214 on the tray are grasped and the tray is then pulled out.

Resting on the base 206 of trough 205 is a rugose layer 220. Conveniently this may consist of vertical grasslike strands with spaces between the strands sufficient for accomodating the fry stages. The rugose plastic product sold under the trademark Astro Turf (Type CH-4, Monsanto Company, St. Louis, Mo.) is a suitable material, and is modified for use herein by removing the cloth backing present and about one half of the grasslike turfs. A distance between strands of from 1 to 3 fry diameter has been found satisfactory, although it is apparent that this range can be varied due to the flexibility of said strands. However, if desired, screened gravel may be employed although this suffers from the disadvantages of increased weight and labor handling costs. Water entering passageway 209a passes under baffle 209 and flows through and over the rugose layer 220, and upwells through and flows over egg tray 210, overflowing at end member 208.

Beneath the housing section 200 is located insert section 300. This consists of end sections 301 and 302, sides 303 and 304 and bottom 305. The length and width of insert section 300 are selected to fit snugly within the bottom of the housing section 200, without binding. Extending transversely across bottom 305 is a slot 306. At the front and back edges of said slot are vertical baffles 307 and 308 extending from sides 303 and 304 as shown in the Figure, baffle 307 is higher than baffle 308. It will be seen that elements 301, 305 and 308 define a trough 309, and a drain means 310 is provided at the bottom thereof. Said trough is located directly under drain 108 of the cover section, so that water passing through 108 will fall through passageway 219 in the housing section into trough 309.

At the other end of the insert section is located a transverse baffle 311. This is spaced from end 302 to define a water passageway 312 which is located beneath end 208 of trough 205, so that water overflowing 208 will fall through passageway 312. The upper edges of 311 and 302 are in the same plane while those of 301 and 307 are somewhat lower.

Located within the insert section between baffles 307 and 311 is essentially an egg tray 313 identical to egg tray 210 and mounted in a similar manner, so that no further description is necessary. Similarly, a rugose layer 314 essentially identical to layer 220 rests on the bottom 305 between end 302 and baffle 307.

In a manner similar to that described in connection with the housing section, water entering passageway 312 of the insert section as the overflow from the housing section, flows through and over rugose layer 314 and upwells and flows over egg tray 313, spills over baffle 307 and passes out through slot 306. Shown mounted on 317 is fry separator 315, which will be discussed in more detail below.

The cover section, housing section and insert section described above, fit together to form an incubator unit, and the additional housing and insert sections may be added to form an incubator stack. A base section 400 having the length and width of the housing section is placed over the lowest or bottom insert section. This contains a suitable opening 401 for leading the water flowing from 310 and through 306 to a fry collection tank.

In operation, the upper housing section is inspected periodically to see whether the eggs have hatched and the alevins have fallen through the screen of the egg tray to the rugose substrate below. After the alevins have fallen through the tray, the access door 216 is opened and the egg trays removed. If desired, a fine mesh cover screen can be inserted in place of the egg tray at this stage. This will prevent migration of the fry alevins from the rugose. Within the rugose layer, the alevins continue their development to the fry stage.

Figure 2:
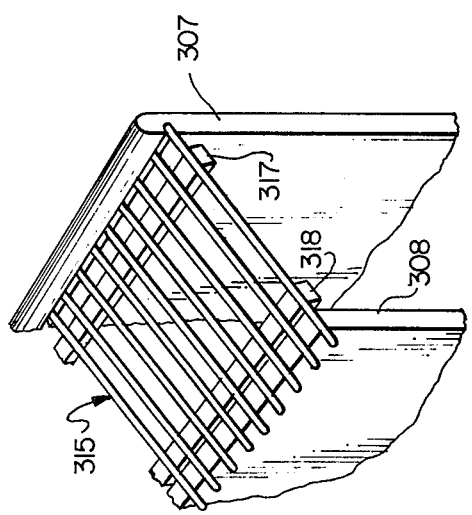
FIG. 2 shows the details of the fry screen.

Just before the fry are expected to migrate, a fry separator 315 is mounted of baffles 307 and 308. As shown in the detail given in FIG. 2, the separator consists of two support strips 317 and 318 with a number of rods glued or otherwise attached to them. The rods rest in a slot cut in baffle 307 and also rest on the top of baffle 308. The strips 317 and 318 are spaced to be adjacent the inner faces of baffles 307 and 308 when the separator 315 is in place. Thus, the fry separator 315 can readily be inserted on and removed from the baffles 307 and 308.

Since the egg trays have been removed at this stage, the fry readily pass along with the stream of water in migrating from the rugose layer. In the housing section, from rugose layer 220, the fry are carried over 208 and enter the lower rugose layer 314. Then, together with fry which had been hatched in insert section 300, they are carried with the water stream over baffle 307. The fry slide down the separator 315 and fall into trough 309 which contains a depth of water obtained from water supply 109 through drain 108 and passageway 219. The fry may be collected after the travel by opening through trough 309 and passing through pipe 310, and fall through the hole in base unit 400.

The invention described above has many advantages over the incubators employed heretofore. Removal of the trays of unhatched eggs without admitting light or having to dismantle the incubator or disturbing the fry by excessive movement reduces the tendency for premature emergence, cuts down on fungus growth and reduces the amount of oxygen needed. If alevins are prematurely pushed out of one tray, they will have the opportunity to settle out in a lower tray.

Efficient use of hatching floor space is greatly enhanced by the incubator described above because the ratio of eggs per unit of floor space can be very high due to the vertical stacking of the units.

Gaseous exchange occurs as the water flows in a thin sheet. This exchange renews dissolved oxygen and eliminates some of the dissolved ammonia metabolic wastes.

Various modifications may be made in the construction without departing from the invention as will be apparent to one skilled in the art. For example, if desired, the incubators can be individually placed on vertical racks or shelves and operated as though stacked. This allows individual units to be removed while lower units are receiving water from above. Flow is horizontal through the substrate but this can be changed to upwelling by placing the substrate on a perforated false bottom about one half inch above the bottom of the tray. The exact dimensions are not critical and if desired longer units can be employed. For convenience the egg trays can be made in short sections which are hooked together for ease of insertion and removal. If desired more than one egg tray can be employed in each section.

Any suitable material can be employed to make to various sections, such as plywood or plastic. The egg trays are conveniently made of aluminum channel frames covered by a plastic mesh held in place by polyethylene strips.

What is claimed is:

1. A fish egg incubator comprising:
   a. a trough having two ends and containing a rugose layer at its bottom;
   b. a screen or screens in said trough located directly above said rugose bottom layer and spaced therefrom and adapted to have fish eggs placed thereon;
   c. the said trough and screens forming a first trough and screen assembly;
   d. the screen having openings slightly smaller than the fish eggs whereby the latter are retained in said screen;
   e. first housing means having sides capable of substantially shielding out light for housing said trough and screen combination; and
   f. access means in one of the sides of said housing means for providing access to its interior;
   g. baffle means near one end of said trough to direct a flow of water through and along said rugose layer and whereby water flows through and along said screen;
   h. water overflow means at the other end of said trough, whereby fry resulting from the incubated eggs pass over the water overflow means;
   i. means for directing a further flow of water on said fry; and
   j. means comprising a vessel containing water for receiving the fry after they pass over the water overflow means.

2. A fish incubator as in claim 1 wherein said water overflow means at the other end of the trough contains means for screening out fry from the water stream.

3. A fish incubator as in claim 2 wherein said screening out means comprises a plurality of downwardly slanting rods mounted on top of the water overflow means, said rods being spaced apart a distance smaller than the average smallest dimension of the fry.

4. A fish incubator as in claim 3 wherein the screen is adapted for removal from the housing through said access means.

5. A fish incubator as in claim 1 wherein:
   a. the said first housing means is open at the top and bottom;
   b. at least one second trough and screen assembly like the first trough and screen assembly mounted below the first assembly and spaced vertically therefrom;
   c. said second assembly having second housing means open at the top and bottom;
   d. the top of the second housing means nesting into the bottom of the first housing means;
   e. baffle means near one end of the second trough substantially aligned vertically with the water overflow means of the first trough whereby water flowing over the overflow means at the end of the first trough is directed into the second assembly;
   f. a cover adapted to fit over the open top of the first assembly having openings to admit water to the assemblies below; and
   g. a base adapted to fit over the bottom of an assembly, the said base having a drain opening for the removal of water.

6. A fish incubator as in claim 5 wherein each screen is adapted to be removed through the first housing through said access means.

7. The fish incubator as in claim 5 wherein the water overflow means of the second trough contain means for screening out fry from the water stream.

8. A fish incubator as in claim 1 wherein the rugose layer comprises a plastic grasslike material.

9. A fish incubator as in claim 5 wherein the rugose layer comprises a plastic grasslike material.

10. A method for hatching fish eggs to fry which comprises:
   a. placing fish eggs on a plurality of screens having openings somewhat smaller than the eggs;
   b. placing at least one screen with its associated eggs in a trough having a rugose bottom layer;
   c. spacing the screen and eggs a short distance from the rugose layer;
   d. repeating steps (b) and (c) to form a plurality of trough and screen assemblies;
   e. mounting the screen and trough assemblies one above the other;
   f. closing said trough and screen assemblies to shut out any light;
   g. flowing a stream of water through and along the screens, and downwardly from one trough and screen assembly to the other by overflow from the troughs;
   h. hatching the eggs to alevins;
   i. permitting the alevins to fall through the screen into the rugose layer;
   j. permitting the alevins to mature into fry in interstices on the rugose layer;
   k. moving the fry out of the troughs with the overflow water;
   l. separating the fry from the overflow water by screening means;
   m. directing an additional flow of water on said separated fry;
   n. dropping said fry vertically together with said overflow and additional water into a fry collector means containing water, and
   o. periodically removing the fry from the collector means without admitting light to the screen and trough assemblies.

* * * * *